| | | |
|---|---|---|
| 106-74 | AU 115 | EX |
| 4/6/76 | XR | 3,948,629 |

United States Patent [19]
Bartholomew et al.

[11] 3,948,629
[45] Apr. 6, 1976

[54] HYDRATION OF SILICATE GLASSES IN AQUEOUS SOLUTIONS

[75] Inventors: Roger F. Bartholomew, Painted Post; Larry E. Campbell; Stanley S. Lewek, both of Corning; Joseph E. Pierson; Stanley D. Stookey, both of Painted Post, all of N.Y.

[73] Assignee: Corning Glass Works, Corning, N.Y.

[22] Filed: Apr. 29, 1974

[21] Appl. No.: 465,243

[52] U.S. Cl. .................................. 65/30 R; 106/74
[51] Int. Cl.² ........................................ C03C 17/00
[58] Field of Search ............... 106/74; 65/30 R, 31

[56] References Cited
UNITED STATES PATENTS

| 2,377,062 | 5/1945 | Adams | 65/31 X |
|---|---|---|---|
| 3,061,495 | 10/1962 | Alford | 65/31 X |
| 3,498,802 | 3/1970 | Bickford | 65/30 X |

*Primary Examiner*—Robert L. Lindsay, Jr.
*Attorney, Agent, or Firm*—Clinton S. Janes, Jr.; Clarence R. Patty, Jr.

[57] ABSTRACT

The present invention relates to a method for hydrating fine-dimensioned alkali metal-containing silicate glass bodies so as to impart the property of thermoplasticity thereto. More particularly, this invention contemplates contacting fine-dimensioned alkali metal silicate glass bodies with an aqueous solution at elevated temperatures and pressures to develop at least a surface layer thereon having a water content ranging up to about 36% by weight, said aqueous solution having a pH less than 6 as measured at room temperature. The hydrated bodies can approach certain properties of high-polymer organic plastics and exhibit the capability of being thermoplastically formed at relatively low temperatures.

14 Claims, No Drawings

HYDRATION OF SILICATE GLASSES IN AQUEOUS SOLUTIONS

The treatment of glass bodies in an atmosphere of steam to cause the penetration of water into the glass structure is well known to the art. Hence, for example, U.S. Pat. No. 3,498,802 discloses the treatment of alkali silicate glass powders in steam at elevated temperatures and pressures. The penetration of water within the powders imparts thermoplastic properties thereto and can produce products demonstrating the behavior of hydraulic cement. The glasses reported in that patent consisted essentially, in mole percent on the oxide basis, of 80–94% $SiO_2$ and 6–20% $Na_2O$ and/or $K_2O$, the sum of those components totalling at least 90 mole percent of the composition. As optional ingredients, the patent suggests PbO, BaO, MgO, $B_2O_3$, $Al_2O_3$, and ZnO. CaO and $Li_2O$ are preferably avoided. In carrying out the hydration process, the glass powders were subjected to a gaseous environment consisting of at least 50% by weight steam at a pressure of at least one atmosphere and a temperature customarily between about 100°–200°C. The exposure to steam was continued for a sufficient length of time to cause the development of at least a surface layer on the powders having a water content up to 30% by weight. At temperatures of 80°–120°C., the treated powders were stated to become adhesive and cohesive which permitted forming into shapes of various configurations through such conventional means as extrusion, pressing, rolling, and injection molding.

A companion disclosure, U.S. Pat. No. 3,498,803, explains in more detal the reaction mechanisms involved in steam hydrating alkali metal silicate glasses and the differences in physical properties demonstrated by the hydrated glass when compared with the original anhydrous glass. Hence, the original anhydrous glass is converted from a hard, brittle body into a rubbery or plastic material. For example, whereas the original glass would commonly exhibit an elastic modulus in excess of 8,000,000 psi, elastic moduli varying between about 30,000–4,000,000 psi may be measured on the hydrated bodies. That patent delineates glass compositions consisting essentially, in mole percent on the oxide basis, of 6–40% $Na_2O$ and/or $K_2O$ and 60–94% $SiO_2$, the sum of those components comprising at least 85 mole percent of the total. PbO, BaO, MgO, $B_2O_3$, $Al_2O_3$, and ZnO are mentioned as suitable compatible metal oxides which could be present as optional ingredients. CaO and $Li_2O$ can be tolerated but are preferably absent in any substantial amount. The hydration treatment involved contacting the glass bodies with a gaseous environment comprising at least 50% by weight steam at a pressure of at least one atmosphere and at an elevated temperature, commonly between about 80°–200°C. The hydration step was carried out for a sufficient period of time to deveop at least a surface portion within the glass which contained about 5–30% by weight water.

Some of the glass products resulting from the disclosure of Pat. Nos. 3,498,802 and 3,498,803 frequently demonstrated such unfavorable chemical durability and resistance to weathering that, unless the surfaces thereof were protected from the ambient atmosphere, the bodies quickly lost their plastic-like properties. The production of alkali metal silicate glass articles which will, under certain conditions, self-degrade in the ambient atmosphere is set forth in U.S. application Ser. No. 249,289, filed May 1, 1972, now Pat. No. 3,811,853. That invention is founded upon the hydration of a particular composition range of $Na_2O$ and/or $K_2O$—$SiO_2$ glasses with the subsequent provision of a weathering resistant surface therefor. The glasses disclosed therein consisted essentially, by weight on the oxide basis, of 10–30% $Na_2O$ and/or $K_2O$ and 65–90% $SiO_2$, the sum of those constituents totalling at least 80% of the composition. The self-degradation begins spontaneously after the weathering-resistant surface has been purposely penetrated or removed, thereby exposing the poorly resistant interior portion to the ambient atmosphere.

In pending U.S. Pat. application Ser. No. 445,453, filed Feb. 25, 1974, there is disclosed a method for producing hydrated alkali metal silicate glass bodies which demonstrate forming capabilities and physical characteristics approaching or even surpassing those of high polymer organic plastic bodies, and which also exhibit chemical durability and weathering resistance of such magnitude as to be practically useful. That invention contemplates a two-step process involving an initial hydration in a saturated or near-saturated steam atmosphere at elevated temperatures and pressures followed by a dehydration step at a lower relative humidity. The dehydration step can be controlled such that the amount of water remaining in the glass can be accurately tailored to provide the desired thermoplastic behavior to the glass while also imparting the desired chemical durability thereto. The glass compositions described therein consist essentially, in mole percent on the oxide basis, of 3–25% $Na_2O$ and/or $K_2O$ and 50–95% $SiO_2$, the total of those components constituting at least 55 mole percent of the overall composition. As optional compatible metal oxides, the specification suggests $Al_2O_3$, BaO, $B_2O_3$, CdO, MgO, PbO, CaO, and ZnO.

In another pending application filed concurrently with Ser. No. 445,453, viz., U.S. application Ser. No. 445,454, there is disclosed a method particularly designed for producing fine-dimensioned, hydrated alkali metal silicate glass bodies which exhibit physical properties similar to those of high polymer organic plastics and with chemical durability and weathering resistance of a practical nature. That method involves a specifically-defined, one-step, steam hydration of glass compositions of similar parameters to those outlined in Ser. No. 445,453 above. In essence, the steam hydration is undertaken in environments of relatively low water content or, in special compositional variations, at greater water contents at higher temperatures. This interaction of water content in the steam atmosphere and glass composition permits careful control of the water diffused into the glass. However, inasmuch as the water content of the steam environmet is low and/or the glass composition is resistant to hydration, this invention is, in the main, directed to fine-dimensioned forms such as beads, powders, ribbon, etc., wherein the water introduced through the steam treatment can penetrate therethrough within a relatively short period of time.

Inasmuch as the purpose of these prior inventions has been to cause water to penetrate into the structure of glass articles, it has seemed self-evident that an environment of liquid water would be more practical and efficient to accomplish this purpose instead of the steam atmospheres employed therein. Nevertheless, extensive experimentation has repeatedly shown this practice to be limitedly operable. Thus, as is explained in U.S. Pat. No. 3,498,803 supra, immersion in liquid $H_2O$ at elevated temperatures and pressures commonly causes disruption of the glass surface and/or leaching thereof. The resulting products are porous and do not demonstrate the desired thermoplastic behavior.

Ser. No. 249,289, referred to above as disclosing the production of self-degradable glasses, discusses the hydration of bulk alkali silicate glass articles, specifically bottles, through the immersion thereof in various aqueous acid and salt solutions. That discussion pointed out two competing reactions occurring simultaneously during such a hydration process. Thus, the first reaction comprises the desired hydration whereas the second involves leaching and dealkalization of the surface layer. These latter phenomena must be carefully controlled to yield a sound surface layer on the glass. No specific glass composition data are provided and two caveats are issued with respect to the process. First, the contacting aqueous solution must be held below the boiling point thereof. Second, the process should only be undertaken on glass articles of good chemical durability.

In Ser. No. 445,453 and Ser. No. 445,454, referred to above, the steam hydration of fine-dimensioned bodies such as powders, beads, fibers, etc. having a thickness dimension of less than about 5 mm. commonly results in the agglomeration or actual fusion of those bodies into an integral mass. This phenomenon precludes the production of hydrated fine-dimensioned bodies wherein the geometry thereof is maintained intact. Yet, the intrinsic utility of hydrated powders, beads, fibers, etc. is self-evident. For example, the thermoplastic behavior imparted to the glass by the included water can be used to great advantage in the fashioning of intricate shapes utilizing conventional forming techniques wherein the charge consists of fine granules. Further, the viscoelastic properties of glass fibers can be significantly altered upon hydration. Thus, the reinforcement characteristics and impact resistance imparted by hydrated glass fibers to a surrounding matrix can be changed substantially from those conferred by anhydrous glass fibers. The relative uniformity of thickness possible in fibers, as compared to granules, also recommends their use since the hydration thereof can be undertaken with great efficiency.

Also, the problem of foaming during the dehydration step, referred to in Ser. No. 445,453 above, is avoided by the present practice.

Therefore, the primary objective of the instant invention is to provide a method for hydrating fine-dimensioned glass bodies, i.e., bodies having a thickness dimension less than about 5 mm., wherein the essential dimensional integrity thereof will commonly be maintained.

We have discovered this objective can be achieved by hydrating fine-dimensioned glass bodies having compositions consisting essentially, in mole percent on the oxide basis, of about 3–25% $Na_2O$ and/or $K_2O$ and 50–95% $SiO_2$, the sum of those components comprising at least 55 mole percent of the total composition in an aqueous solution wherein the pH is maintained below 6 and, most preferably, below 5.

As is the case with steam hydration, the most rapid penetration of $H_2O$ into the glass structure takes place in the simple alkali silicate glasses where the alkali content is substantial, e.g., at least about 10%. It is believed that, contrary to the mechanism postulated in steam hydration, there is no simple diffusion of $H_2O$ into the glass where an acidic medium is employed. Rather, an ion exchange of $H_3O^+$ for $Na^+$ and/or $K^+$ ions is also involved. The presence of other components in addition to the alkali metal oxides and silica can be quite useful in modifying the chemical and physical character of hydrated glass, as well as that of the original anhydrous glass. For example, the inclusion of such compatible metal oxides as $Al_2O_3$, $BaO$, $B_2O_3$, $CdO$, $MgO$, $CaO$, $PbO$, and $ZnO$ can be beneficial in altering the melting and forming properties of the base glass and/or in improving the chemical durability of both the base glass and the hydrated glass. $CaO$, $BaO$, $ZnO$, and $PbO$ can be included in amounts up to about 25%; $MgO$ is operable up to about 35%; and $Al_2O_3$ can be used advantageously up to 20%. With respect to other optional ingredients, it is preferred that individual additions thereof not exceed about 10%. $Li_2O$ appears to inhibit hydration and, therefore, will normally be present, if at all, in amounts less than about 5%. $CaO$ frequently results in a translucent or opaque hydrated body which would militate against its use where transparency is demanded. Common glass colorants such as $Fe_2O_3$, $CoO$, $NiO$, $CdS$-$Se$ may also be employed in the customary amounts up to a few percent. Of course, where the function of these components is not limited to coloring, individual additions up to about 10% can be tolerated. And, where desired or needed, fining agents in conventional amounts can be used.

The method of the instant invention comprises first melting a batch for a particular glass composition and forming the resulting melt into fine-dimensioned bodies. The methods for forming such fine-dimensioned articles are well known to the art. For example, fibers can be drawn or formed by passing a stream of molten glass through an air blast and small particles of glass can be produced by running a stream of molten glass through a flame or into water. Thin glass ribbon can be drawn which is broken into flakes.

Thereafter, the fine-dimensioned glass bodies are contacted with aqueous silutions having a pH below 6 and, preferably, below 5, as measured at room temperature, this contact being made at temperatures of at least 100°C. and under pressures greater than about 20 psig. The rate of hydration with a particular glass composition will be dependent upon the pressure and temperature parameters employed. Commonly, the rate will inrease with higher pressures and temperatures. The maximum hydration temperature that can successfully be utilized is essentially mandated by the resistance of the glass composition to attack by the aqueous solution and/or the softening point of the glass. Thus, the desired products will maintain their physical integrity during the hydration process. Surface attack and/or softening of the glass bodies will frustrate that desire. In general, then, temperatures below the softening point of the glass will be used with 374°C. being deemed a practical maximum.

There is a maximum temperature at which any gas can be liquefied; or the converse, a maximum temperature at which a liquid can be prevented from converting to the gaseous state. That temperature has been designated the critical temperature. As a corollary thereto, there is a critical pressure demanded to liquefy a gas at the critical temperature. For water, the critical temperature is about 374°C. and the critical pressure is about 3200 psi. At temperatures above the critical temperature, $H_2O$ has been defined a fluid which is not deemed to be either a liquid or gas.

Therefore, inasmuch as aqueous solutions are contemplated in the invention and excellent hydration is achieved at temperatures below the critical temperature, 374°C. and 3200 psi pressure have been considered practical oprating maxima for those parameters.

The water content absorbed by the glass is dependent upon two factors: first, the composition of the glass; and, second, the composition of the hydrating medium utilized. However, when those two factors are held constant, the time, temperature, and pressure employed in the actual hydration treatment will affect the depth of water penetration but will have little significant effect upon the amount of water absorbed unless such extensive times and temperatures are employed to cause attack upon or softening of the glass.

In summary, the present invention contemplates the hydration of fine-dimensioned alkali metal silicate glass bodies of specified compositions wherein the quantity of water absorbed can be well controlled. Hence, water contents effective to impart thermoplasticity and up to 36% by weight can be achieved under certain compositional and operational conditions. Furthermore, this hydration can be accomplished without experiencing the foaming phenomenon discussed in the two-step practice of Ser. No. 445,453 and the fusion of fine-dimensioned glass bodies referred to in the one-step process of Ser. No. 445,454. Finally, the control of the amount of water absorbed permits the securing of good chemical durability to those compositions wherein the original anhydrous glass demonstrates intrinsic good durability.

Table I recites a number of glass compositions, expressed both in weight percent and mole percent on the oxide basis, which are useful in the instant invention. The batch ingredients therefor can comprise any materials, either the oxides or other compounds, which, when melted together, will be converted into the desired oxide composition in the proper proportions. These batch constituents were thoroughly mixed together, frequently in a ball mill to aid in achieving a homogeneous melt, and then melted in open platinum or silica crucibles for about 16 hours at 1450°–1600°C. (It will be appreciated that larger melts can conveniently be made in pots or continuous melting tanks in accordance with conventional commercial glassmaking practice.) Subsequently, the crucible melts were cooled and shaped into glass bodies of desired configuration. Fibers were hand drawn and small rounded granules were made by pouring the melt into tap water. Although the present invention is peculiarly suited for use with fine-dimensioned bodies, i.e., bodies of a thickness dimension of 5 mm. and less, the hydration reaction will take place in articles of thicker dimensions and it is often more convenient to measure the chemical and physical properties of the glass utilizing such larger bodies. Therefore, cane samples having a ⅛ inch diameter were hand drawn from each melt for that purpose.

TABLE I

| | Weight Percent | | | | |
|---|---|---|---|---|---|
| | 1 | 2 | 3 | 4 | 5 |
| $SiO_2$ | 80 | 76.5 | 66.3 | 60.3 | 86 |
| $Na_2O$ | 11.8 | 17.0 | 11.5 | 15.5 | 14 |
| $K_2O$ | 3.2 | — | — | — | — |
| $Al_2O_3$ | 5.0 | 3.5 | — | — | — |
| MgO | — | 3.0 | — | — | — |
| PbO | — | — | 22.2 | 24.2 | — |

TABLE I-continued

| | Weight Percent | | | | |
|---|---|---|---|---|---|
| | 1 | 2 | 3 | 4 | 5 |
| | 6 | 7 | 8 | 9 | 10 |
| $SiO_2$ | 90 | 92 | 74 | 80 | 57 |
| $Na_2O$ | 10 | 8 | 26 | 20 | 4 |
| $K_2O$ | — | — | — | — | 8 |
| $Al_2O_3$ | — | — | — | — | 1 |
| MgO | — | — | — | — | — |
| PbO | — | — | — | — | 30 |

| | Mole Percent | | | | |
|---|---|---|---|---|---|
| | 1 | 2 | 3 | 4 | 5 |
| $SiO_2$ | 83.2 | 76.7 | 79.5 | 73.7 | 86.4 |
| $Na_2O$ | 11.8 | 16.7 | 13.4 | 18.3 | 13.6 |
| $K_2O$ | 1.9 | — | — | — | — |
| $Al_2O_3$ | 3.1 | 2.1 | — | — | — |
| MgO | — | 4.5 | — | — | — |
| PbO | — | — | 7.1 | 8.0 | — |
| | 6 | 7 | 8 | 9 | 10 |
| $SiO_2$ | 90.3 | 92.3 | 74.6 | 80.5 | 76.8 |
| $Na_2O$ | 9.7 | 7.7 | 25.4 | 19.5 | 5.2 |
| $K_2O$ | — | — | — | — | 6.2 |
| $Al_2O_3$ | — | — | — | — | 0.8 |
| MgO | — | — | — | — | — |
| PbO | — | — | — | — | 11.0 |

Table II records the results obtained by hydrating ⅛ inch diameter cane samples in acid solutions buffered to permit maintenance of pH during the hydration reaction. The hydration process was conducted in an autoclave since such apparatus allows good control of temperature and pressure. In each instance, the cane sample was immersed in a container of the designated solution and pressure was developed within the autoclave by heating a quantity of the same solution placed in the bottom thereof. Regulation of the pressure was had by controlling the temperature within the autoclave.

The length of time required to attain hydration completely through the glass body or to any desired depth therein is a function of the composition thereof as well as of the solution composition, pressure, and temperature utilized. Hence, it is normally true that glasses containing higher alkali metal contents will hydrate more rapidly and to higher water concentrations so long as the ratios of any other glass constituents therein are not altered. Commonly, such glass will also be less chemically durable. Higher temperatures and pressures will, likewise, generally promote more rapid hydration. It is self-evident that the time demanded to achieve hydration throughout a body will be dependent upon the thickness of the anhydrous glass body. And, whereas the preferred practice of the invention contemplates hydrating the glass bodies therethrough, it can be recognized that a utility can be held in developing only a hydrated surface layer on the bodies. In general, hydration temperatures of about 200°–300°C. and times ranging between about 2–48 hours will be employed.

A temperature of 240°C. was employed resulting in a pressure within the autoclave of about 460 psi. Steady state operation of the commercial, electrically-heated autoclave utilized in the treatments reported in Table II was reached in about one and one-half hours. The temperature was maintained for 12 hours after which the electric current to the autoclave was cut off and the apparatus allowed to cool to room temperature with the glass retained therein. In the table, the thickness of the hydrated layer after autoclaving at temperature for 12 hours is expressed in terms of millimeters (mm) and the amount of water absorbed, as determined conventionally by loss on ignition, expressed in terms of weight percent. In column 1, a pH of 1.5 was obtained through an aqueous solution of 1 ml. concentrated HCl in 100 ml. $H_2O$ buffered through the addition of 2 g potassium acid phthalate. In column 2, a pH of 3.6 was achieved in an aqueous solution containing 6 g acetic acid in 100 ml. $H_2O$ buffered through the addition of 0.8 g sodium acetate. In column 3, a pH of 4.6 was secured utilizing 0.6 g acetic acid and 0.82 g sodium acetate in 100 ml. $H_2O$.

expressed in the same terms (mm. and weight percent, respectively) as in Table II.

Column 1 records a $K_2SO_4$ solution containing 20 grams $K_2SO_4$ per 100 ml. $H_2O$ and an operating pressure of 478 psi. Column 2 describes a $K_2SO_4$ solution of 150 grams $K_2SO_4$ per 100 ml. $H_2O$ and a hydration pressure of 350 psi. Column 3 reports a KCl solution having 5 grams KCl per 100 ml. $H_2O$ and an operating pressure of 450 psi. Column 4 discloses a KCl solution formed of 25 grams KCl per 100 ml. $H_2O$ and an operating pressure of 465 psi. Column 5 discusses a KCl solution containing 150 grams KCl per 100 ml. $H_2O$

TABLE II

| Example No. | pH 1.5 Hydration Thickness m.m. | pH 1.5 $H_2O$ Content wt % | pH 3.6 Hydration Thickness m.m. | pH 3.6 $H_2O$ Content wt % | pH 4.6 Hydration Thickness m.m. | pH 4.6 $H_2O$ Content wt % |
|---|---|---|---|---|---|---|
| 1 |  | 13.7 | 1.84 | 36.2 | 1.572 | 8.2 |
| 2 | 0.516 | 14.0 | 0.71 | 21.1 | 0.744 | 19.4 |
| 3 |  | 9.6 |  | 11.5 |  | 4.9 |
| 4 | 0.552 | 15.2 | 0.66 | 18.6 | 0.504 | 18.0 |
| 5 | 0.696 | 13.6 | 0.744 | 17.1 | 2.268 | 17.1 |
| 6 | 0.276 | 11.9 |  | 12.5 | 0.72 | 12.0 |
| 7 | 0.276 | 5.1 | 0.504 | 2.5 | 0.66 | 6.1 |
| 8 | 2.364 | 15.0 | 2.496 | 16.6 | 2.616 | 17.6 |
| 9 | 2.328 | 14.9 |  | 12.0 | 2.124 | 15.2 |

Examination of the cane samples after hydration where the operating pressure was 390 psi.

TABLE III

| Example | $K_2SO_4$ 25 g/100 ml. Hydration m.m. Thickness | $K_2SO_4$ 25 g/100 ml. $H_2O$ wt% Content | $K_2SO_4$ 150 g/100 ml. Hydration m.m. Thickness | $K_2SO_4$ 150 g/100 ml. $H_2O$ wt% Content | KCl 5 g/100 ml. Hydration m.m. Thickness | KCl 5 g/100 ml. $H_2O$ wt% Content | KCl 25 g/100 ml. Hydration m.m. Thickness | KCl 25 g/100 ml. $H_2O$ wt% Content | KCl 150 g/100 ml. Hydration m.m. Thickness | KCl 150 g/100 ml. $H_2O$ wt% Content |
|---|---|---|---|---|---|---|---|---|---|---|
| 1 | 1.26 | 12.8 | 1.416 | 14.7 |  | 14.4 | 0.84 | 11.7 | 0.288 | 10.2 |
| 2 | 0.396 | 10.3 | 0.216 | 15.1 | 0.3 | 19.9 | 0.24 | 12.6 |  | 9.7 |
| 3 |  | 7.2 | 0.54 | 9.3 | 0.912 |  | 0.42 | 8.7 |  | 4.2 |
| 4 | 0.24 | 18.0 | 0.384 | 18.4 | 0.564 | 18.6 | 0.216 | 9.5 |  |  |
| 5 | 1.56 | 13.4 | 2.304 | 11.7 |  | 18.5 |  | 9.1 | 1.056 | 5.7 |
| 6 | 0.924 | 12.2 | 0.684 | 14.5 | 1.536 | 15.2 | 0.816 | 9.4 | 1.548 | 5.8 |
| 7 | 0.828 | 9.0 | 0.564 | 7.1 | 0.528 | 12.0 | 0.312 | 7.5 | 0.696 | 1.4 |
| 8 | 1.728 | 9.9 | 2.4 | 13.0 |  |  | 0.888 | 20.0 | 2.328 | 13.7 |
| 9 |  | 20.3 |  | 17.2 | 2.4 | 21.9 | 1.14 | 8.6 | 0.66 | 10.7 | evidenced no breakdown of the $SiO_2$ structure and the surfaces appeared to be essentially free from leaching attack. It is postulated that an ion exchange of $H^+$ ions from the solution for alkali metal ions in the glass takes place on a molar equivalent basis which leads to the hydrated samples demonstrating at least equivalent, and in glasses of high alkali metal content, superior chemical durability to that manifested by the anhydrous glass. In general, the rate of hydration appears to be somewhat slower at lower pH levels. However, the amount of water retained in the glass appears to be more dependent upon glass composition than the pH of the hydrating solution. Thus, a direct correlation is believed to exist between the alkali metal content of the glass and the amount of $H_2O$ absorbed therein. Analysis of the hydration solution following the treatment exhibited a change in pH of less than 0.2 units.

Table III reports the hydration of ⅛ inch diameter cane samples in neutral aqueous salt solutions containing no buffering reagent. The reaction was carried out in an autoclave in the same manner and under the same operating conditions as were recorded above with respect to the acid solutions of Table II. Hence, hydration was undertaken at 240°C. for 12 hours. The thickness of the hydrated layer after autoclaving at temperature for 12 hours and the amount of water absorbed are Inasmuch as the recited solutions were not buffered to maintain an acidic environment, the surfaces of the cane samples manifested a leached and/or crystallized appearance indicating a rise in pH during the hydration reaction which was confirmed through measurements thereof after hydration conducted at room temperature. This phenomenon supports the fact that the hydrating solutions must be maintained acidic to assure sound surface layers on the hydrated bodies. Chemical analyses of the hydrated products have shown an exchange occurring between the $K^+$ ions in the solution and the $Na^+$ ions in the glass. Although not true in all cases, there seems to be a general trend that an increase in the acid or salt concentration of the contacting solution gives rise to a lower $H_2O$ content in the hydrated glass. No firm correlation between the rate of hydration and the acid or salt concentration of the contacting solution appears possible, although there is a trend indicating a decrease in rate with increase in acid or salt concentration. Therefore, the use of saturated solutions is not desirable on that basis as well as being unattractive costwise.

Although in each of the examples of Tables II and III a bath of an aqueous solution having the same composition as that of the contacting solution was utilized to generate the atmosphere within the autoclave, that practice, while preferred, is not mandatory for the successful operation of the invention. Thus, a simple steam atmosphere can provide the necessary pressurized environment. However, there is some evidence that the water content absorbed may be somewhat less than where the atmosphere is provided by the solution. This appears to be particularly true with buffered acid solutions. Various inert gases such as nitrogen, $CO_2$, argon, and helium can also be injected into the environment with no substantive deleterious effect upon the hydration.

The following example provides a further illustration of hydration utilizing a weakly acidic solution as the hydration medium and further demonstrates the improved chemical durability which the hydration process conducted in an acidic medium, i.e., a pH less than 5, can impart to the glass. Thin ribbon (about 10–25 microns thick) of Example No. 10 of Table I was immersed in a solution consisting of 50 g $Pb(NO_3)_2$ in 100 ml. $H_2O$ acidified with $HNO_3$ to a pH of about 1, placed in an autoclave, and heated at 260°C. and a pressure of 570 psi for 16 hours. The surrounding atmosphere was developed within the autoclave by heating a quantity of the same solution placed in the bottom thereof. Ignition loss determined the absorption by the glass of about 6.7% $H_2O$. The chemical durability of the glass was measured by immersing the ribbon into distilled water at 70°C. for 20 hours. Weight loss of the ribbon before hydration (in $\mu g/cm^2$) was 5.6 $Na_2O$, 3.6 $K_2O$, and 1.3 PbO. After hydration, the values were 5.1 $Na_2O$, 1.5 $K_2O$, and 1.3 PbO.

As illustrating the ion exchange occurring between the $H_3O^+$ and alkali metal ions during the hydration process, chemical analysis of the ribbon after hydration exhibited a decrease in $Na_2O$ content from 4% to 0.2% by weight and a decrease in $K_2O$ content from 8% to 2.2% by weight.

Where desired, the hydrated particles can be shaped into bulk articles employing forming methods conventional in the organic plastics art. Such forming operations normally involve shaping a mass under pressure and, although it may be possible to form shapes at about room temperature, somewhat elevated temperatures are preferred since better flow in the hydrated material will be obtained. A practical maximum forming temperature of about 500°C. has been determined for the present glass compositions with temperatures in the range of 100°–400°C. being commonly employed. Inasmuch as some volatilization of the absorbed water can take place during the forming step, shaping of the articles within a pressurized system may be warranted.

Particles varying in size from a No. 4 U.S. Standard Sieve (4.76 mm) to a No. 400 U.S. Standard Sieve (37 microns) have been found especially convenient for shaping into bulk bodies. In the following examples, particles passing a No. 80 U.S. Standard Sieve (177 microns) and remaining on a No. 140 U.S. Standard Sieve (105 microns) in Examples 1, 2, 3, and 5 of Table I, which had been hydrated for 3½ hours at 240°C. in a solution consisting of 5 grams of $K_2SO_4$ in 100 ml. $H_2O$ and having a pH of about 5, were placed in a 1¼ inches diameter mold which had been preheated and a slight pressure applied (10–50 psi). The unit was thereupon heated to about 250°C. to cause incipient softening. A load of between about 7000 psi was then applied to the mold for about 3 minutes. Thereafter, the heat was removed, the mold allowed to cool below 60°C., the load released, and a disc (⅛–¼ inch in thickness) taken from the mold. Table IV records visual observations of the resulting discs.

TABLE IV

| | | |
|---|---|---|
| Example No. 1 | Flowed Well | Essentially clear |
| Example No. 2 | Flowed Well | Mostly clear, small cloudy portion |
| Example No. 3 | Flowed Well | Yellow, transparent, few cracks |
| Example No. 5 | Flowed Well | Mostly clear, small cloudy portion |

We claim:

1. A method for making a hydrated glass body exhibiting thermoplastic properties which comprises contacting a fine-dimensioned anhydrous glass body consisting essentially, in mole percent on the oxide basis, of about 3–25% $Na_2O$ and/or $K_2O$ and 50–95% $SiO_2$, the sum of those components constituting at least 55% of the total composition, with an aqueous solution environment having a pH less than 6, as measured at room temperature, this contact being made at a temperature in excess of 100°C. and at a pressure in excess of 20 psig for a period of time sufficient to hydrate at least a surface portion having an amount of $H_2O$ absorbed therein effective to impart thermoplastic properties thereto.

2. A method according to claim 1 wherein said temperature ranges up to about 374°C.

3. A method according to claim 1 wherein said temperature ranges between about 200°–300°C.

4. A method according to claim 1 wherein said pressure ranges up to about 3200 psi.

5. A method accordng to claim 1 wherein said aqueous solution is buffered to maintain the pH below 6 during the hydration process.

6. A method according to claim 1 wherein said aqueous solution has a pH less than 5.

7. A method according to claim 4 wherein said hydrated glass body exhibits greater chemical durability than the anhydrous glass body.

8. A method according to claim 1 wherein said fine-dimensioned glass body has a thickness dimension no greater than about 5 mm.

9. A method according to claim 1 wherein said aqueous solution contains an acid and/or a salt.

10. A method according to claim 9 wherein said aqueous solution contains said acid and/or salt in an amount up to saturation.

11. A method according to claim 1 wherein said amount of water absorbed ranges up to about 36%.

12. A method according to claim 1 wherein said time ranges between about 2–48 hours.

13. A method for forming shapes from the fine-dimensioned glass bodies made in accordance with claim 1 exhibiting thermoplastic properties which comprises the steps of:
   a. forming a mass of said bodies to a shape of a desired configuration under pressure and at a temperature ranging from about room temperature to about 500°C.; and, thereafter,
   b. bringing said shape to room temperature.

14. A method according to claim 9 wherein said mass of bodies is formed at a temperature between about 100°–400°C.

* * * * *

UNITED STATES PATENT OFFICE
CERTIFICATE OF CORRECTION

PATENT NO. : 3,948,629
DATED : April 6, 1976
INVENTOR(S) : Roger F. Bartholomew, Larry E. Campbell, Stanley S. Lewek, Joseph E. Pierson and Stanley D. Stookey It is certified that error appears in the above-identified patent and that said Letters Patent are hereby corrected as shown below:

Column 1, line 33, "detal" should be -- detail --.

Column 1, line 61, "sure" should be -- sures --.

Column 2, line 55, "environmet" should be -- environment --.

Column 4, line 23, after "CoO" insert -- CuO --.

Column 4, line 40, "silutions" should be -- solutions --.

Column 4, line 47, "inrease" should be -- increase --.

Column 5, line 5, "oprating" should be -- operating --.

Column 6, line 4, delete column numbers "1, 2, 3, 4, 5".

Column 6, line 46, "glass" should be -- glasses --.

Column 6, line 54, "held" should be -- had --.

Column 9, line 32, "Pbo" should be -- PbO --.

Signed and Sealed this

Seventeenth Day of August 1976

[SEAL]

Attest:

RUTH C. MASON
Attesting Officer

C. MARSHALL DANN
Commissioner of Patents and Trademarks